(12) United States Patent
Spagnuolo

(10) Patent No.: US 6,422,779 B1
(45) Date of Patent: Jul. 23, 2002

(54) BALL JOINT

(75) Inventor: Steven P. Spagnuolo, Maryville, TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/484,164

(22) Filed: Jan. 18, 2000

(51) Int. Cl.⁷ .................................. B62D 3/12
(52) U.S. Cl. ................. 403/138; 403/144; 280/93.514; 280/93.511
(58) Field of Search ................. 403/144, 136, 403/138; 280/93.511, 245, 43.21, 93.514

(56) References Cited

U.S. PATENT DOCUMENTS

| | | | |
|---|---|---|---|
| 2,749,161 A | | 6/1956 | Latzen |
| 3,113,787 A | * | 12/1963 | Lauderdale ............ 280/86.758 |
| 3,128,110 A | * | 4/1964 | Herbenar .................... 403/138 |
| 3,693,999 A | * | 9/1972 | Wood, Jr. ............... 403/133 X |
| 3,871,469 A | * | 3/1975 | Millard et al. ...... 280/93.514 X |
| 3,926,070 A | * | 12/1975 | Busso ............... 280/93.514 X |
| 3,944,015 A | * | 3/1976 | Bishop ............. 280/93.514 X |
| 3,944,376 A | * | 3/1976 | Hata .......................... 403/132 |
| 4,063,834 A | * | 12/1977 | Hanson ....................... 403/138 |
| 4,297,047 A | * | 10/1981 | Farrant ................... 403/144 X |
| 4,519,268 A | | 5/1985 | Oda |
| 4,695,181 A | * | 9/1987 | Rahmede et al. ........... 403/135 |
| 5,080,520 A | | 1/1992 | Wood, Jr. |
| 5,154,530 A | * | 10/1992 | Dresselhouse .............. 403/138 |
| 5,704,726 A | * | 1/1998 | Nemeto ...................... 403/133 |
| 5,772,352 A | * | 6/1998 | Fukumoto et al. .......... 403/144 |
| 5,890,394 A | * | 4/1999 | Anderson .......... 280/93.514 X |

FOREIGN PATENT DOCUMENTS

| | | | | |
|---|---|---|---|---|
| GB | 797545 | * | 7/1958 | ................. 403/138 |
| GB | 914575 A | * | 1/1963 | |
| GB | 1451811 A | * | 10/1976 | |

* cited by examiner

*Primary Examiner*—Lynne H. Browne
*Assistant Examiner*—Ernesto Garcia
(74) *Attorney, Agent, or Firm*—Tarolli, Sundheim, Covell, Tummino & Szabo L.L.P.

(57) ABSTRACT

A ball joint (10) includes a socket (40) with a housing (42) and a stem portion (44). The housing (42) defines a chamber (60). A ball stud (80) has a ball portion (82) in the chamber (60) and a stud portion (84) extending from the ball portion. The ball portion (82) has a center (90) and the stud portion (84) has an axis (86) intersecting the center. The ball portion (82) has an equator (92) extending perpendicular to the axis (86) and dividing the ball portion into first and second hemispheres (94, 96). First and second bearings (110, 120) are located in the chamber (60) and engage the first and second hemispheres (94, 96), respectively, of the ball portion (82). First and second dampers (130, 132) act between the socket (40) and the respective first and second bearings (110, 120) and bias the first and second bearings toward the equator (92) and provide first and second clearances (131, 133), respectively, between the socket (40) and the first and second bearings.

1 Claim, 3 Drawing Sheets

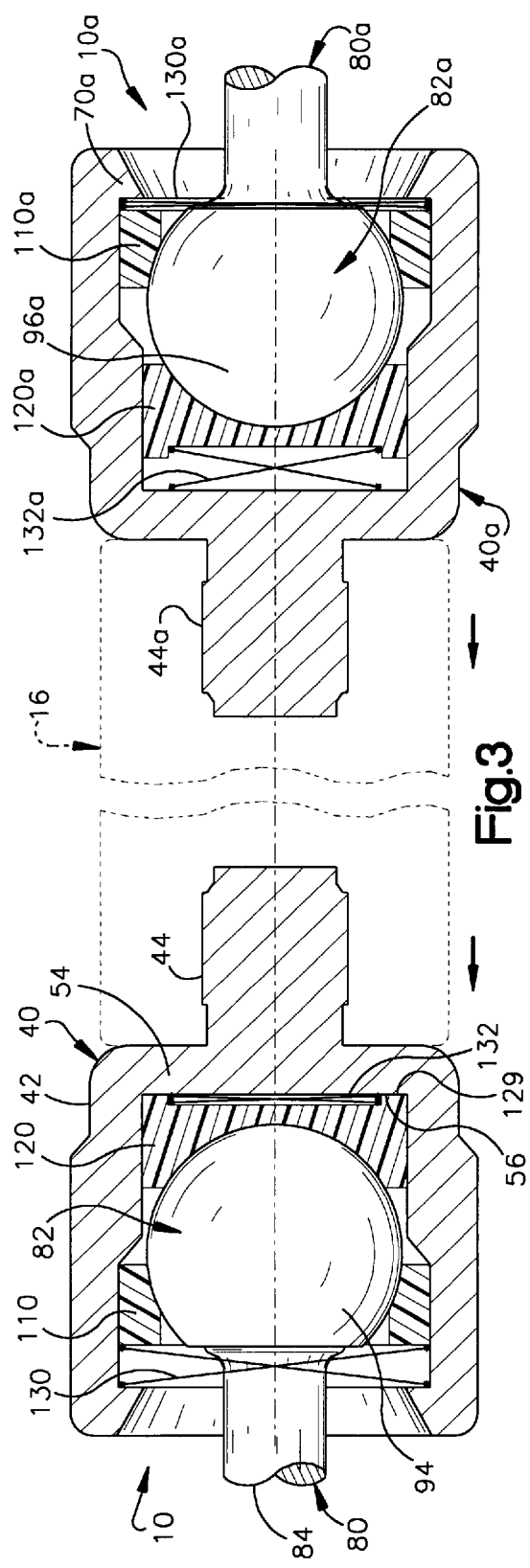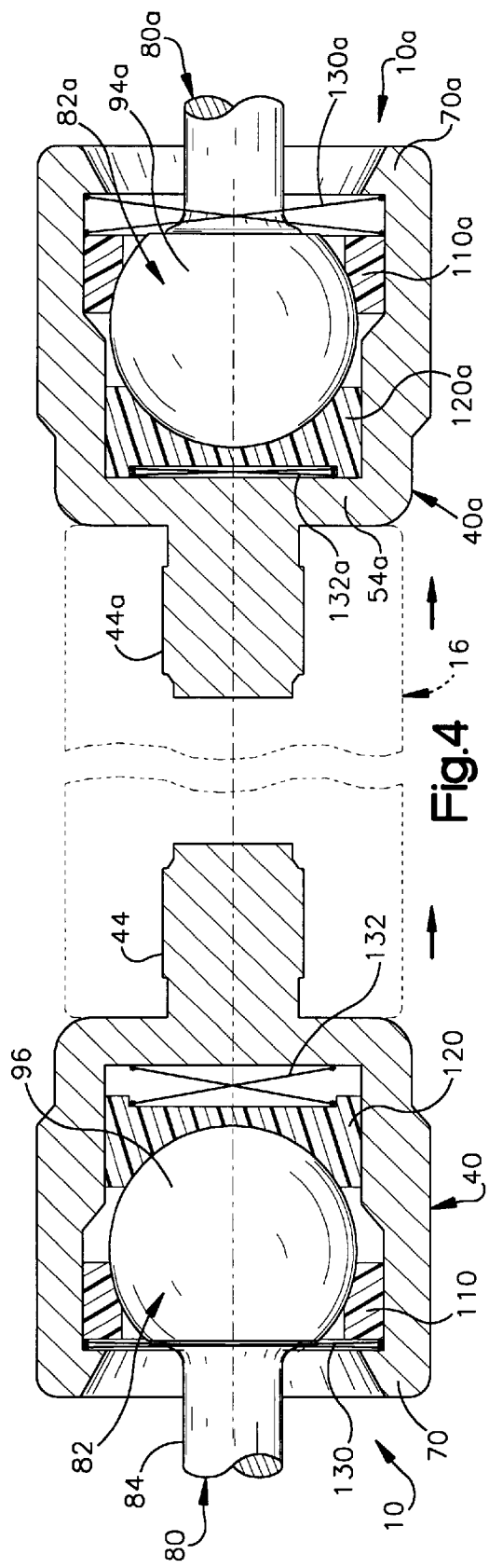

BALL JOINT

BACKGROUND OF THE INVENTION

1. Technical Field

The present invention relates to a ball joint for connection between a steerable vehicle wheel and a rack of a rack and pinion steering gear.

2. Description of the Prior Art

A vehicle rack and pinion steering gear includes a rack that is movable axially to effect steering movement of steerable wheels of the vehicle. The movement of the rack is transmitted through steering linkage to the steerable wheels. The steering linkage typically includes a pair of ball joints on opposite ends of the rack. Each ball joint includes a ball stud in a socket. One or more bearings are interposed between the ball stud and the socket. During the life of the vehicle, the parts of the ball joint inevitably wear, producing lash in the ball joint. Excessive lash is undesirable.

The rack and pinion steering gear is typically mounted to the vehicle frame by resilient bushings. The bushings enable a small amount of movement of the steering gear relative to the frame. This movement helps to take up road shocks transmitted from the steerable wheels back through the linkage to the steering gear. This movement can also produce vagueness or other undesirable characteristics in the steering system.

SUMMARY OF THE INVENTION

The present invention is an apparatus for connection between a rack of a rack and pinion steering gear and a steerable vehicle wheel. The apparatus comprises a socket including a housing and a stem portion extending in a first direction from the housing. The stem portion is connectable with the rack. The housing defines a chamber and has an opening in communication with the chamber.

A ball stud has a ball portion in the chamber and a stud portion extending from the ball portion through the opening. The ball portion has a center and the stud portion has an axis intersecting the center. The stud portion extends from the ball portion in a direction opposite the first direction. The ball portion of the ball stud has an equator extending perpendicular to the axis of the stud portion, the equator dividing the ball portion into first and second hemispheres.

The apparatus comprises first and second bearings located in the chamber and engaging the first and second hemispheres, respectively, of the ball portion. The apparatus also comprises first and second dampers acting between the socket and the respective first and second bearings and biasing the first and second bearings toward the equator and providing first and second clearances, respectively, between the socket and the first and second bearings.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a sectional view showing the two ball joints in a first condition when the steering gear is actuated to steer in a first direction; and FIG. 4 is a view similar to FIG. 3 showing the two ball joints in a second condition when the steering gear is actuated to steer in a second direction opposite the first direction.

DETAILED DESCRIPTION OF AN EMBODIMENT OF THE INVENTION

Figure 1:
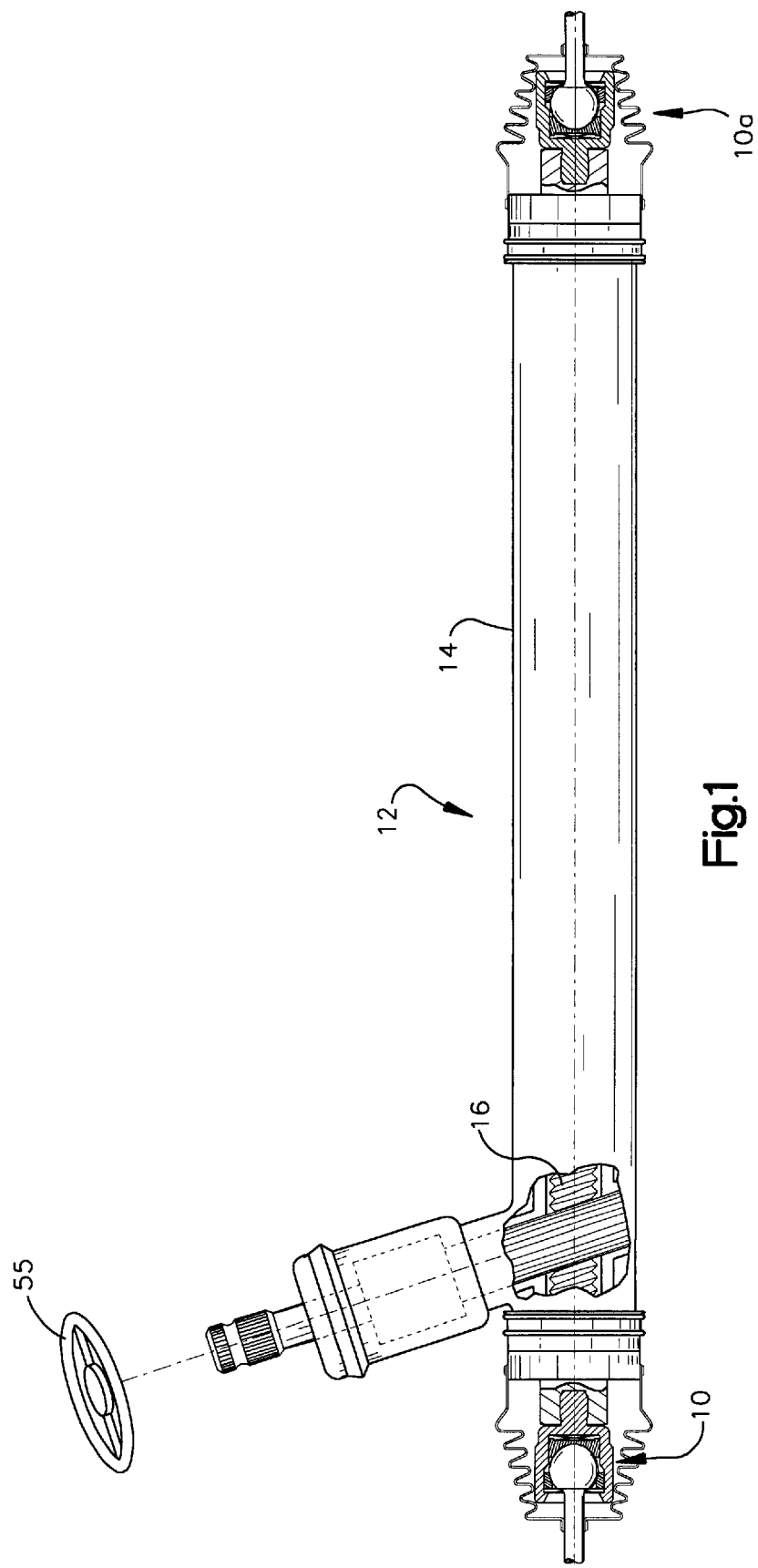
FIG. 1 is a schematic illustration of a fluid power assisted rack and pinion steering gear including two identical ball joints constructed in accordance with the present invention.

The present invention relates to a rack and pinion vehicle steering gear, and in particular relates to a ball joint for connection between a steerable vehicle wheel and a rack of a rack and pinion steering gear. The present invention is applicable to various ball joint constructions. As representative of the present invention, FIG. 1 illustrates a ball joint 10 that forms a part of a fluid power assisted vehicle rack and pinion steering gear 12. An identical ball joint 10a is located at the opposite end of the rack 16. Because the two ball joints 10 and 10a are identical in construction, only the ball joint 10 is described in detail below.

The steering gear 12 (FIG. 1) includes a housing 14. A steering member in the form of a rack 16 is supported by and is movable relative to the housing 14. The ball joints 10 and 10a are located at opposite ends of the rack 16. The ball joints 10 and 10a connect the rack 16 with suitable steering linkage (not shown) such as tie rods for effecting steering movement of the vehicle. Upon movement of the rack 16 relative to the housing 14, the steerable wheels of the vehicle are turned. The steering gear 12 can include a hydraulic power assist system (not shown) that is operable in a known manner, upon rotation of the vehicle steering wheel 20, to move the rack 16 axially to effect steering movement of the vehicle.

The ball joint 10 (FIG. 2) includes a shell or socket 40. The socket 40 is made as one piece, preferably from metal. The socket 40 includes a housing 42 and a stem portion 44.

The housing 42 has a generally cylindrical side wall 50 centered on an axis 52 of the socket 40. The housing 42 has a circular inner end wall 54 that extends perpendicular to the side wall 50 and closes one end of the housing. The inner end wall 54 of the housing 42 has a circular inner side surface 56. The side wall 50 and the end wall 54 define a chamber 60 in the housing 42.

The side wall 50 of the housing 42 has a first inner side surface 62. The first inner side surface 62 has a cylindrical configuration centered on the axis 52. The first inner side surface 62 extends from the inner side surface 62 of the end wall 50 in a direction away from the inner end wall 54.

The side wall 50 of the housing 42 has a second inner side surface 64. The second inner side surface 64 has a frusto-conical configuration centered on the axis 52. The second inner side surface 64 extends from the first inner side surface 62 of the side wall 50 in a direction away from the inner end wall 62.

The side wall 50 of the housing 42 has a third inner side surface 66. The third inner side surface 66 has a cylindrical configuration centered on the axis 52. The third inner side surface 66 extends from the second inner side surface 64 of the side wall 50 in a direction away from the inner end wall 54. The diameter of the third inner side surface 66 is greater than the diameter of the first inner side surface 62.

An outer end portion 68 of the side wall 50 is rolled inward toward the axis 52. The rolled end portion 68 of the side wall 50 forms an outer end wall 70 of the housing 42. The outer end wall 70 has an inner side surface 72 that faces the inner side surface 56 of the inner end wall 54 at the other end of the chamber 60. The outer end wall 70 defines an opening 74 into the housing 42. The opening 74 is in communication with the chamber 60.

The stem portion 44 of the socket 40 has a cylindrical configuration. The stem portion 44 extends in a first direction 76 from the housing 42, that is, to the left as viewed in FIG. 2. The stem portion 44 is externally threaded and is screwed into an end portion of the rack 16 shown schematically at 78 in FIG. 2.

The ball joint 10 also includes a ball stud 80. The ball stud 80 has a ball portion 82 located in the chamber 60 in the housing 42. A stud portion 84 of the ball stud 80 extends from the ball portion 82 through the opening 74 in the housing 42. The stud portion 84 of the ball stud 80 has an elongate, cylindrical configuration centered on an axis 86. The axis 86 of the stud portion 84 forms an axis of the ball stud 80. The stud portion 84 of the ball stud 80 extends from the ball portion 82 in a direction 88 opposite the first direction 78, that is, to the right as viewed in FIG. 2.

The ball portion 82 of the ball stud 80 has a center of rotation 90. The ball stud axis 86 and the socket axis 52 both extend through, or intersect, the center 90 of the ball portion 82 of the ball stud 80. The ball portion 82 of the ball stud 80 has an equator 92. The equator 92 extends through the center 90 and is perpendicular to the axis 86.

The equator 92 divides the ball portion 82 into first and second hemispheres 94 and 96. The first hemisphere 94 is located adjacent the opening 74 in the housing 42 and has an outer side surface 98. The second hemisphere 96 is located adjacent the stem portion 44 of the socket 40 and has an outer side surface 100. The outer side surface 98 of the first hemisphere 94 and the outer side surface 100 of the second hemisphere 96 together form the spherical outer surface of the ball portion 82 of the ball stud 80.

The ball joint 10 includes a first bearing 110. The first bearing 110 is preferably made from metal, but could alternatively be made from another material, such as plastic. The first bearing 110 is located in the chamber 60 in the housing 42.

The first bearing 110 has a cylindrical outer side surface 112 that is in sliding engagement with the third inner side surface 66 of the side wall 50 of the housing 42. The first bearing 110 has a part-spherical bearing surface 114 that is in sliding engagement with the outer surface 98 of the first hemisphere 94 of the ball portion 82 of the ball stud 80. The first bearing 110 has a ring-shaped or annular end surface 116 that is presented toward the inner surface 72 of the outer end wall 70 of the housing 42.

The ball joint includes a second bearing 120. The second bearing 120 is made from the same material as the first bearing 110. The second bearing 120 is located in the chamber 60 in the housing 42.

The second bearing 120 has a cylindrical outer side surface 122 that is in sliding engagement with the first inner side surface 62 of the side wall 50 of the housing 42. The second bearing 120 has a part-spherical bearing surface 124 that is in sliding engagement with the outer surface 100 of the second hemisphere 96 of the ball portion 82 of the ball stud 80. The second bearing 120 has a ring-shaped shoulder portion 126 that circumscribes a circular inner surface portion 128 of the second bearing. The shoulder portion 126 has a ring-shaped outer surface 129 that is presented toward the inner surface 56 of the inner end wall 54 of the housing 40. A spring pocket is defined radially inward of the shoulder portion 126.

The ball joint 10 includes a first damper illustrated schematically at 130. The first damper 130 may be made from metal or another material, such as a cellular material, suitable for providing a biasing force on the ball stud 80 relative to the socket 40. In the illustrated embodiment, the first damper 130 is a compression spring that acts between the outer end wall 70 and the first bearing 110.

The first damper 130 is disposed in the chamber 60 in the housing 42, between the end surface 116 of the first bearing 110 and the inner side surface 72 of the outer end wall 70 of the housing 42. The first damper 130 biases the first bearing 110 toward the equator 92 of the ball stud 80, and holds the first bearing away from the outer end wall 70 of the socket 40. The first damper 130 thus provides a first clearance 131 between the socket 40 and the first bearing 110.

The ball joint 10 includes a second damper illustrated schematically at 132. The second damper 132 is preferably made from the same material as the first damper 130. In the illustrated embodiment, the second damper 132 is a compression spring that acts between the inner end wall 54 and the second bearing 120.

The second damper 132 is disposed in the chamber 60 in the housing 42, between the circular inner surface portion 128 of the second bearing 120 and the inner surface 56 of the inner end wall 54 of the housing 40. The second damper 132 biases the second bearing 120 toward the equator 90 of the ball stud 80, and holds the second bearing away from the inner end wall 54 of the socket 40. The second damper 132 thus provides a second clearance 133 between the socket 40 and the second bearing 120.

Figure 2:
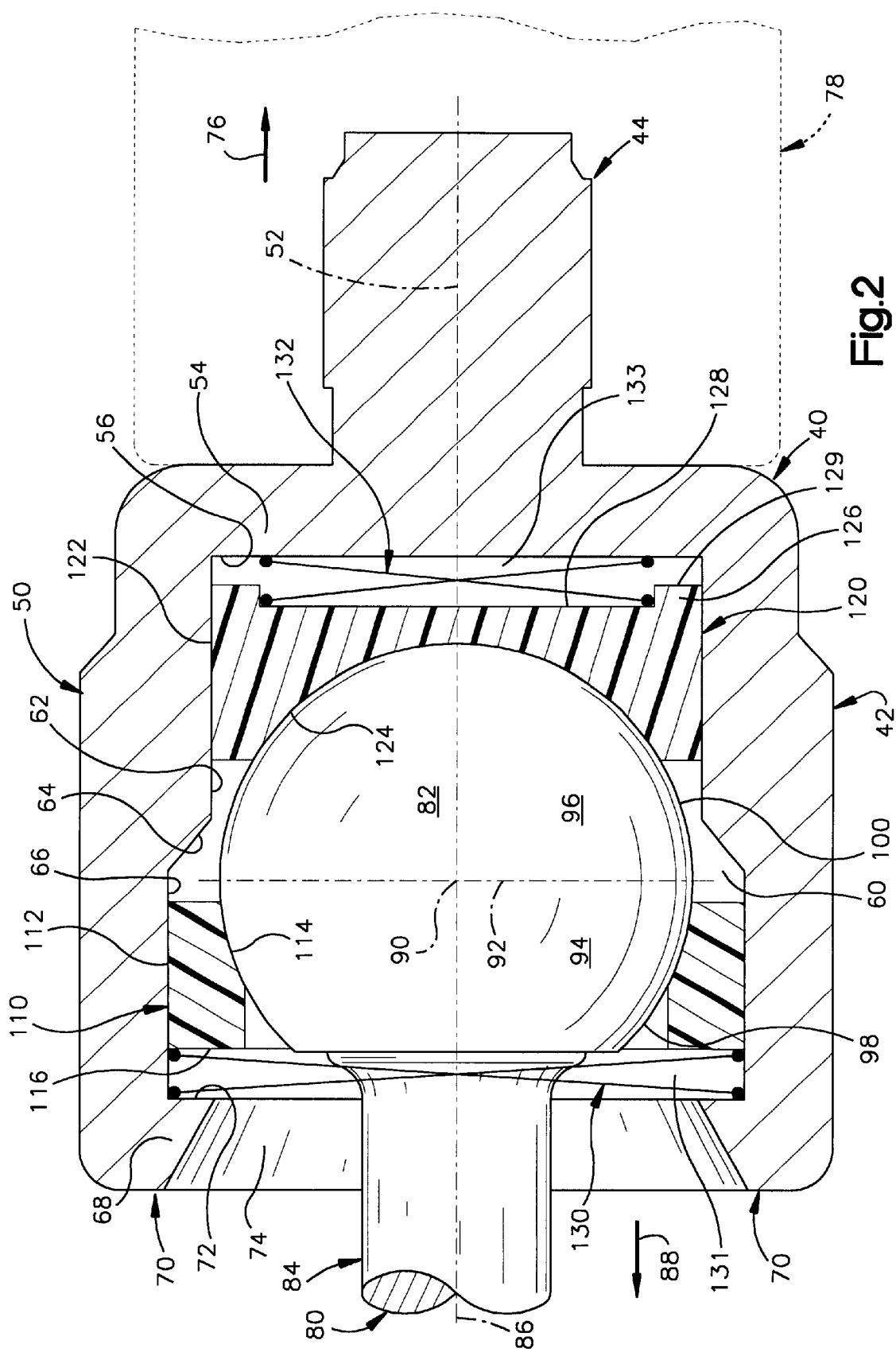
FIG. 2 is an enlarged sectional view of one of the ball joints of the steering gear of FIG. 1.

FIG. 2 illustrates the ball joint 10 in a "neutral" condition, that is, a condition in which no steering force is being applied to the socket 40 by the rack 16. The outer surface 129 on the second bearing 120 is spaced apart from the inner end wall 54 of the socket 40. The outer end surface 116 on the first bearing 110 is spaced apart from the outer end wall 70 of the socket 40. The first and second dampers 130 and 132 are each partially but not fully. compressed.

The ball joint 10a (FIGS. 1, 3 and 4) is identical in construction to the ball joint 10, and is not described in detail herein. Corresponding parts of the ball joint 10a are given the same reference numerals with the suffix "a" attached. These parts include a shell or socket 40a; first and second bearings 110a and 120a; first and second dampers 130a and 132a; and a ball stud 80a.

FIG. 3 illustrates a portion of the steering gear including both the ball joint 10 and the ball joint 10a, shown in a condition in which steering force is being applied by the rack 16. Specifically, steering force is being applied by the rack 16 to move the rack and the ball joints 10 and 10a in a direction to the left as viewed in FIG. 3.

At the ball joint 10, the force of the rack 16 is applied through the stem portion 44 of the ball joint into the socket 40. The socket 40 is pushed to the left and applies force through the second damper 132 and the second bearing 120 to the ball stud 80. The load of the vehicle steerable wheel connected with the ball joint 10 resists movement of the ball stud 80 to the left. As a result, the second damper 132 compresses and the inner end wall 54 of the socket 40 moves toward and into engagement with the second bearing 120. Specifically, relative sliding movement between the socket 40 and the second bearing 120, in a direction along the axis 52, causes the surface 56 on the inner end wall 54 of the socket 40 to move into abutting engagement with the outer end surface 129 on the second bearing 120.

The force of movement of the rack 16 is thereafter transmitted through the socket 40 directly into the second bearing 120. The second bearing 120, which is in engagement with the second hemisphere 96 of the ball portion 82 of the ball stud 80, transmits this force into the ball stud. The ball stud 80 moves and transmits the steering force of the rack 16 to the vehicle steerable wheel to which it is linked. The first damper 130 expands axially, maintaining the first bearing 110 in engagement with the first hemisphere 94 of the ball portion 82 of the ball stud 80.

At the same time, the opposite movement is occurring in the ball joint 10*a* at the other end of the rack 16. Specifically, the force of movement of the rack 16 pulls the socket 40*a* to the left and applies force through the first damper 130*a* to the ball stud 80*a*. The load of the vehicle steerable wheel connected with the ball joint 10*a* resists movement of the ball stud 80*a* to the left. As a result, the first damper 130*a* compresses and the outer end wall 70*a* of the socket 40*a* moves toward but not into engagement with the first bearing 110*a*.

The force of movement of the rack 16 is thereafter transmitted through the socket 44*a* and the first bearing 110*a* into the ball stud 80*a*. The ball stud 80*a* moves and transmits the steering force of the rack 16 to the vehicle steerable wheel to which it is linked. When the first damper 130*a* of the ball joint 10*a* is compressed, the second damper 132*a* expands axially, maintaining the second bearing 120*a* in engagement with the second hemisphere 96*a* of the ball portion 82*a* of the ball stud 80*a*.

The dampers 130 and 132 in the ball joint 10 provide a limited amount of lash in the ball joint. The specific amount of lash is dependent on the compressive force of the dampers 130 and 132, on the preset distance between the first bearing 110 and the outer end wall 70, and on the preset distance between the second bearing 120 and the inner end wall 54. The presence of lash in the ball joints 10 and 10*a* can make it possible to mount the steering gear 12 rigidly to the vehicle frame, eliminating the expense of a resilient mounting structure including bushings. The design of the ball joint 10 also minimizes the effects of wear of the parts of the ball joint. Specifically, as the bearings 110 and 120 or the ball portion 82 wear, resulting clearance is taken up by the dampers 130 and 132.

FIG. 4 illustrates a condition in which steering force is being applied by the rack 16 to move the rack and the ball joints 10 and 10*a* in a direction to the right as viewed in FIG. 3.

At the ball joint 10*a*, the force of the rack 16 pushes the socket 40*a* to the right and applies force through the second damper 132*a* to the ball stud 80*a*. The second damper 132*a* compresses and the inner end wall 54*a* of the socket 40*a* moves toward and into engagement with the second bearing 120*a*. The force of movement of the rack 16 is thereafter transmitted through the socket 40*a* directly into the second bearing 120*a*. The second bearing 120*a* transmits this force into the ball stud 80*a*. The ball stud 80*a* moves and transmits the steering force of the rack 16 to the vehicle steerable wheel to which it is linked. The first damper 130*a* expands axially, maintaining the first bearing 110*a* in engagement with the first hemisphere 94*a* of the ball portion 82*a* of the ball stud 80*a*.

At the same time, the opposite movement is occurring in the ball joint 10 at the other end of the rack 16. Specifically, the force of movement of the rack 16 pulls the socket 40 to the right and applies force through the first damper 130 and the first bearing 110 to the ball stud 80. The first damper 130 compresses and the outer end wall 70 of the socket 40 moves toward but not into engagement with the first bearing 110. The force of movement of the rack 16 is thereafter transmitted through the socket 44 and the first bearing 110 into the ball stud 80. The ball stud 80 moves and transmits the steering force of the rack 16 to the vehicle steerable wheel to which it is linked. The second damper 132 expands axially, maintaining the second bearing 120 in engagement with the second hemisphere 96 of the ball portion 82 of the ball stud 80.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for connection to a steerable wheel of a vehicle, said apparatus comprising:

a rack having a neutral position and being movable in opposite directions from said neutral position;

a socket comprising a housing and a stem portion extending in a first direction from the housing, said stem portion being connected with the rack for movement with the rack, said housing defining a chamber and an opening in communication with said chamber;

a ball stud having a ball portion in said chamber and a stud portion extending from said ball portion through said opening, said ball portion having a center and said stud portion having an axis intersecting said center, said stud portion extending from said ball portion in a second direction opposite said first direction;

said ball portion of said ball stud having an equator extending perpendicular to the axis of said stud portion, said equator dividing said ball portion into first and second hemispheres;

said apparatus comprising first and second bearings located in said chamber and engaging said first and second hemispheres, respectively, of said ball portion; and said apparatus comprising first and second dampers acting between said socket and said first and second bearings, biasing said first and second bearings respectively toward said equator, and providing first and second clearances, respectively, between said socket and said first and second bearings when said rack is in said neutral condition;

said housing and said stem portion being movable relative to said ball stud by force applied to said housing and said stem portion by said rack in response to movement of said rack in said first direction during a steering maneuver, said housing and said stem portion being movable relative to the ball stud close said first clearance to cause the force applied to said rack to be applied by said housing to said stud through said first bearing to move said stud with said rack, said first damper compressing and said second clearance expanding and said second damper expanding as said housing and said stem portion move relative to said ball stud by the force applied by said rack during movement of said rack in said first direction, said stem portion is connected with a first end portion of said rack, said rack having a second end portion opposite said first end portion, said apparatus further comprising:

a second socket comprising a second housing and a second stem portion extending, in the second direction, from said second housing, said second stem portion being connected with said second end portion of said rack for movement with said rack, said second housing defining a second chamber and having a second opening in communication with said second chamber;

a second ball stud having a second ball portion in said second chamber and a second stud portion extending from said second ball portion through said second opening, said second ball portion having a second center and said second stud portion having an axis intersecting said second center, said second stud portion extending from said second ball portion in said first direction;

said second ball portion of said second ball stud having a second equator extending perpendicular to the axis of said second stud portion, said second equator dividing said second ball portion into first and second hemispheres;

said apparatus further comprising third and fourth bearings located in said second chamber and engaging said first and second hemispheres, respectively, of said second ball portion; and said apparatus further comprising third and fourth dampers acting between said second socket and said third and fourth bearings, biasing said third and fourth bearings respectively toward said second equator, and providing third and fourth clearances, respectively, between said second socket and said third and fourth bearings when said rack is in said neutral condition;

said second housing and said second stem portion being movable relative to said second ball stud by force applied to said second housing and said second stem portion by said rack in response to movement of said rack in said first direction during a steering maneuver, said second housing and said second stem portion being movable relative to the second ball stud to close said third clearance to cause the force applied to said rack to be applied by said second housing to said second stud through said third bearing to move said second stud with said rack, said third damper compressing and said fourth clearance expanding and said fourth damper expanding as said second housing and said second stem portion move relative to said second ball stud by the force applied by said rack during movement of said rack in said first direction.

\* \* \* \* \*